3,038,806
GROWTH ACCELERATING COMPOSITIONS
Jean Metivier, Arpajon, and Louis Julou, Paris, France, assignors to Societe des Usines Chimiques Rhone-Poulenc, Paris, France, a French body corporate
No Drawing. Filed Nov. 10, 1958, Ser. No. 772,705
Claims priority, application France Feb. 7, 1958
2 Claims. (Cl. 99—2)

This invention relates to compositions capable of accelerating the growth of animals, and, in particular, to compositions the active ingredients of which have anabolic properties.

The compositions of this invention which when repeatedly administered are capable of enhancing the weight increase of growing animals, for example, rats, dogs, fowls, pigs, sheep or cattle, comprise, as an active ingredient, 2-formyl-4-chlorophenoxy-acetic acid or a non-toxic salt thereof, for example the sodium or other mineral salt, the ammonium salt or amine salt, together with a non-toxic diluent. The expression "non-toxic" as used herein in connection with diluents or salts means that the diluent or salt is innocuous to the animal organisms in the doses employed and in particular in the case of salts, that the beneficial effects ascribable to the anion are not vitiated by any side-effects of the cation.

The compositions of this invention are generally administered orally. The preferred compositions are those in which the diluent is an animal foodstuff, i.e., an organic or mineral substance which is intended to be fed to animals, or water.

The dosage level can be varied widely and the optimum in any particular case can readily be determined by simple experiment. A dosage of 0.001 to 1% based on the total of foodstuffs and water given to the animal has been found to give satisfactory results, a dosage of 0.005 to 0.05% being preferred. The proportion of active ingredients in the compositions can also be varied at will, the only requirement being that they must provide a suitable dosage.

The enhancement of the weight increase of animals produced by the compositions of this invention results from formation of new tissue rather than from an increase in the reserves of water of the organism, as has been shown by analyses made on rats which had received these products in addition to their food. Moreover these compositions have no troublesome secondary actions. For example, it has been shown that they have no cancer-promoting action either in vivo or vitro. The animals treated therefore remain in excellent health and, in fact, their natural mortality is lower than that of control animals.

The following example illustrates the invention:

*Example*

Two groups of ten young male rats of homogeneous strain received for 4 weeks identical food which contained 50% of glucides, 25% of proteins, 3.5% of lipids, and 3% of mineral salts and vitamins, the remainder consisted of water.

The treated rats received in addition 100 mg./kg. bodyweight of 2-formyl-4-chlorophenoxyacetic acid, as an aqueous solution of the sodium salt, per day by oral administration. The concentration of the solution was such that the volume of solution administered was 5 cc./kg. The control rats received only pure water in the same proportion of 5 cc./kg.

The mean weight of the rats of each group was noted each week and the mean percentage weight increase was determined.

The results were as follows:

| Group | Mean weight at the start of the experiment, g. | Percent increase in the mean weight | | | | Mean weight after 4 weeks, g. |
|---|---|---|---|---|---|---|
| | | 1 week | 2 weeks | 3 weeks | 4 weeks | |
| Treated rats | 150 | 15.3 | 30.6 | 44.6 | 61.7 | 242.6 |
| Control rats | 155 | 11.6 | 15.4 | 17 | 37 | 212.4 |

At the end of the experiment, the water content of the animals was determined. In the treated animals a mean content of 62.1% was found and in the controls, a mean content of 67.1%. This clearly showed not only that the gains in weight were not caused by hydration of the tissue, but also that the active ingredient promoted the formation of new tissue.

We claim:
1. A composition for enhancing the weight increase of growing animals comprising an active ingredient selected from the class consisting of 2-formyl-4-chlorophenoxyacetic acid and non-toxic salts thereof, together with a foodstuff, said active ingredient being present in sufficient proportion to affect said enhancement upon repeated administration of said composition.

2. A method of enhancing the weight increase of growing animals which comprises administering to them repeatedly a compound selected from the class consisting of 2-formyl-4-chlorophenoxyacetic acid and non-toxic salts thereof, the amount of said compound administered in a given period being 0.001 to 1% of the total weight of foodstuffs and water taken by the animal in said period.

References Cited in the file of this patent
UNITED STATES PATENTS
2,925,341    Kaemmerer _____ Feb. 16, 1960
OTHER REFERENCES
Rowe: American Jr. of Veterinary Research, October 1954, vol. 15, pp. 622–8.